March 25, 1952

A. E. ARMSTRONG 2,590,224

THREADING ATTACHMENT FOR LATHES

Filed Jan. 17, 1947

INVENTOR
Adam E. Armstrong
BY
ATTORNEY.

March 25, 1952   A. E. ARMSTRONG   2,590,224
THREADING ATTACHMENT FOR LATHES
Filed Jan. 17, 1947   6 Sheets-Sheet 2

INVENTOR
Adam E. Armstrong
BY
ATTORNEY.

March 25, 1952  A. E. ARMSTRONG  2,590,224
THREADING ATTACHMENT FOR LATHES
Filed Jan. 17, 1947  6 Sheets-Sheet 4
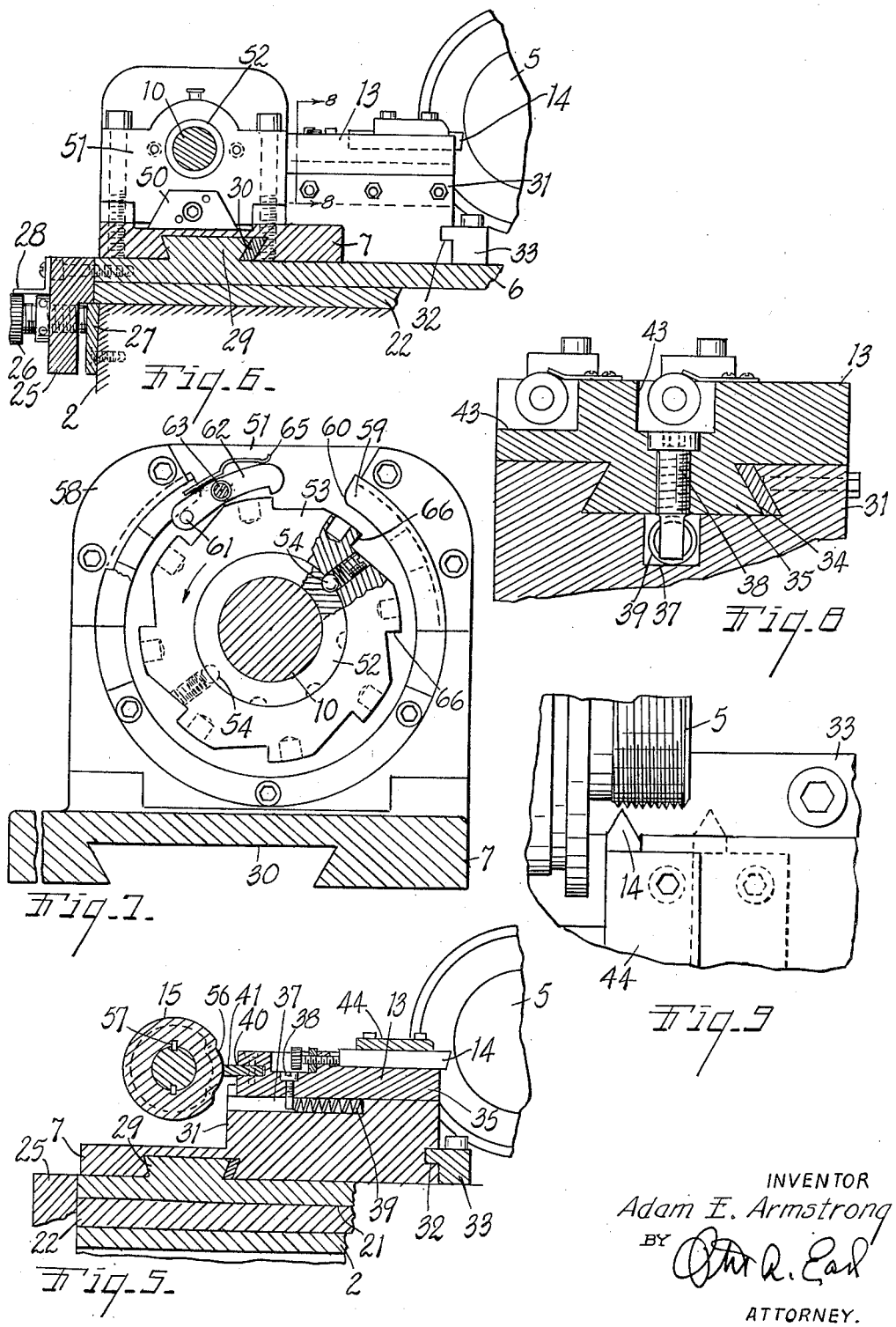
INVENTOR
Adam E. Armstrong
BY
ATTORNEY.

March 25, 1952  A. E. ARMSTRONG  2,590,224
THREADING ATTACHMENT FOR LATHES
Filed Jan. 17, 1947  6 Sheets-Sheet 5

INVENTOR
Adam E. Armstrong
BY
ATTORNEY.

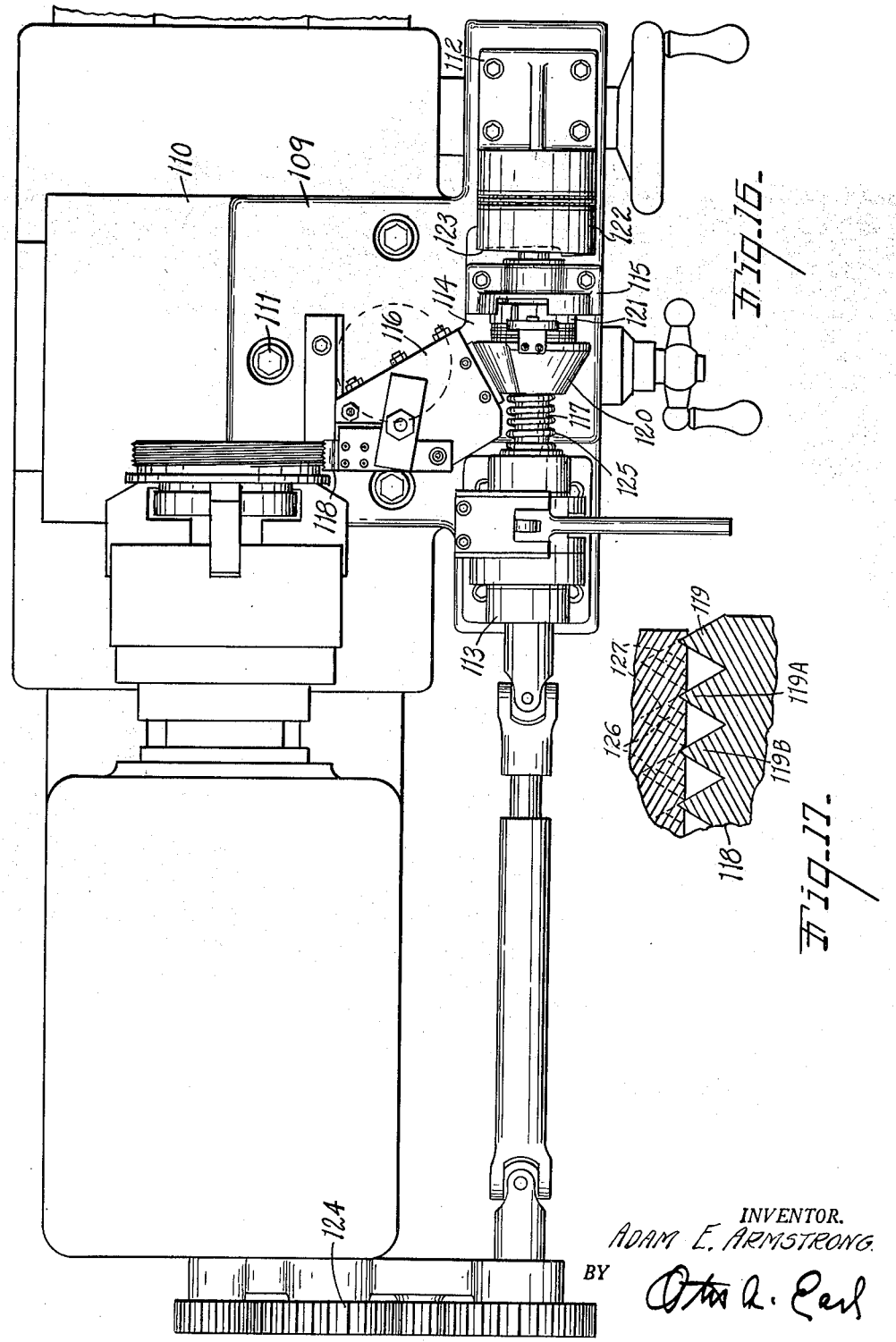

Patented Mar. 25, 1952

2,590,224

UNITED STATES PATENT OFFICE 2,590,224

THREADING ATTACHMENT FOR LATHES

Adam E. Armstrong, Three Rivers, Mich., assignor to Armstrong Machine Works, Three Rivers, Mich.

Application January 17, 1947, Serial No. 722,488

29 Claims. (Cl. 10—101)

This invention relates to improvements in threading attachment for lathes.

The principal objects of this invention are:

First, to provide an attachment for a lathe which will permit the lathe to be used for automatically forming threads on a work piece.

Second, to provide a threading attachment for a lathe which will automatically feed a cutting tool through a series of successively deeper threading cuts along the work piece.

Third, to provide a threading attachment which will position a cutting tool in a series of successively advanced transverse starting positions with respect to the work piece.

Fourth, to provide an intermittently operating cam mechanism in a threading machine for automatically advancing a cutting tool both longitudinally and transversely of the work piece for successively deeper thread cutting operations.

Fifth, to provide tool advancing mechanism for a thread cutting tool which will pick up or overtake previously cut threads permitting different sections of the thread to be cut by different cutting edges of a tool to reduce the number of rotations of the work piece and amount of lead travel of the tool necessary to complete the thread.

Sixth, to provide cam mechanism for feeding a cutting tool transversely against a work piece and automatically retracting the tool prior to longitudinal retraction of the tool from the work piece.

Other objects and advantages pertaining to this invention will be apparent from the description to follow. The invention is further pointed out in the claims.

The drawings, of which there are six sheets, illustrate a preferred form of my threading attachment and one modified form thereof.

Fig. 5 is a fragmentary transverse cross sectional view along the plane 5—5 in Fig. 4.

Fig. 6 is a fragmentary transverse cross sectional view along the plane 6—6 in Figs. 2 and 4.

Fig. 7 is a fragmentary transverse cross sectional view along the plane 7—7 in Figs. 2 and 4.

Fig. 8 is a fragmentary longitudinal cross sectional view along the plane 8—8 in Fig. 3.

Fig. 9 is an enlarged fragmentary plan view illustrating the relationship of the cutting tool to the work piece in longitudinally advanced and retracted position, the retracted position being shown in dotted lines.

Fig. 10 is a fragmentary elevational view partially broken away in vertical cross section showing the clutch mechanism of the attachment in disengaged position.

Fig. 10A is a fragmentary cross sectional view along the plane 10A—10A in Fig. 10.

Fig. 11 is a fragmentary transverse cross sectional view along the plane 11—11 in Fig. 2.

Fig. 12 is an enlarged, detailed cross sectional view showing the relative positions of the cutting tool and work piece at the beginning of the threading operation and indicating successive cutting positions.

Fig. 13 is a developed view of the periphery of the rachet cam used to advance the cutting tools and showing the relative positions of the cam faces thereon.

Fig. 16 is a plan view of a modified form of threading attachment.

Fig. 17 is an enlarged cross sectional view showing the details of the cutting edges in Fig. 16 and indicating the various successive cutting operations.

Figure 1:
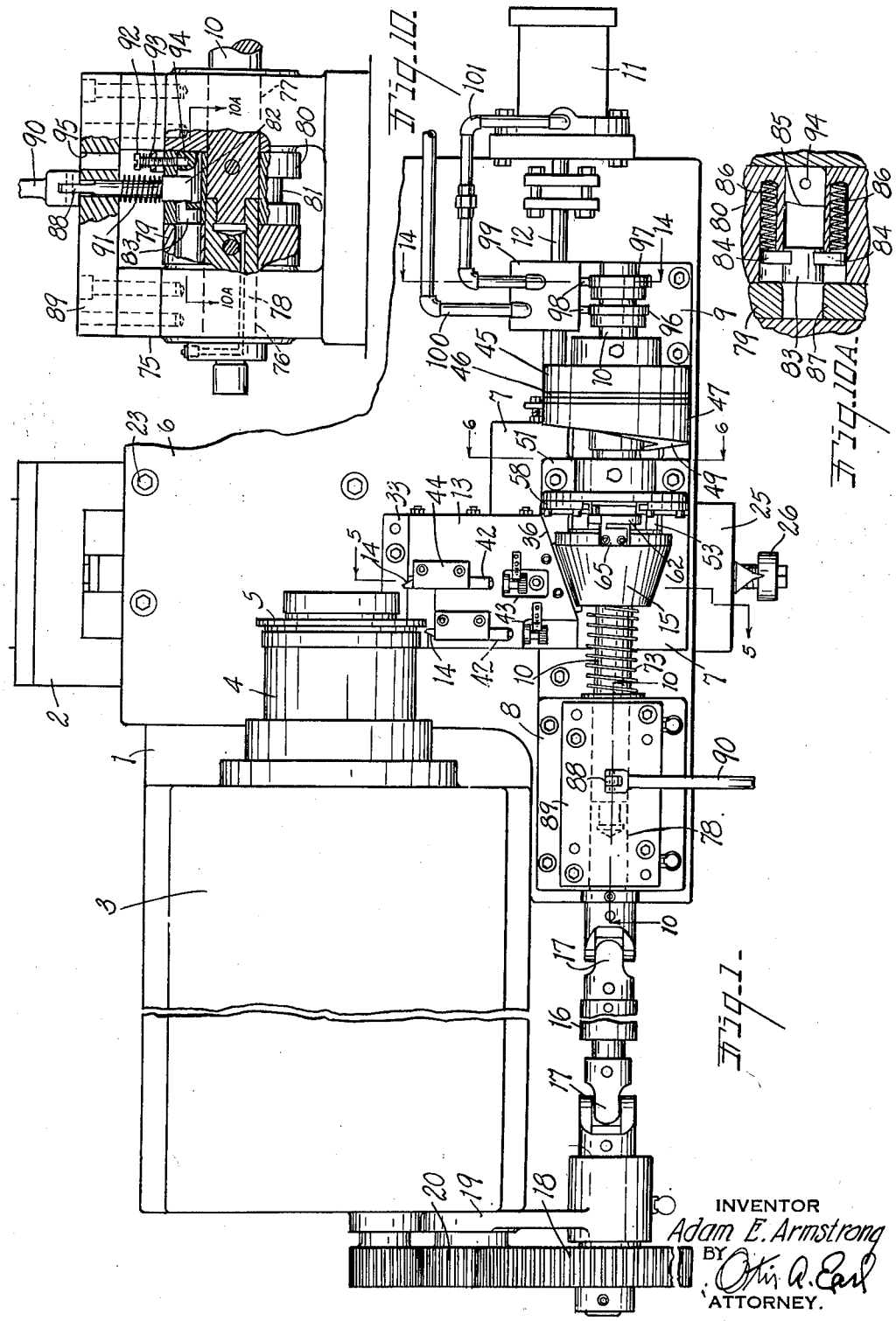
Fig. 1 is a fragmentary plan view partially broken away of my threading attachment as mounted on a standard lathe having a movable carriage.

In the drawings the reference character 1 indicates a standard lathe having a movable carriage 2 and head stock 3 which supports a standard chuck 4 for holding a work piece 5. My attachment consists generally of a base plate 6 which is mounted on the carriage 1 and is transversely and longitudinally adjustable with respect to the head stock and work piece therewith. The base plate supports a carriage plate 7 which is longitudinally movable relative to the base plate and a clutch housing 8 and bearing block 9 which are fixed relative to the base plate and aligned to support a cam shaft 10. The end of the base plate also supports an air cylinder 11 which is arranged to longitudinally retract the carriage 7 by means of the rod 12 connected therebetween.

The carriage 7 is provided with a tool holding plate 13 which is transversely slidable along the carriage 7 to transversely feed one or more cutting tools 14 to the work piece 5. The tool holder 13 is arranged to be intermittently advanced to the work piece by engagement with the cone shaped cam 15 rotatably mounted on the cam shaft 10. Power for rotating the cam shaft is obtained through the clutch mechanism 8 from a telescoping shaft 16 connected through the universal joints 17 to a driving gear 18. The driving gear 18 is mounted on a bracket 19 on the end of the head stock and connected through the gear train 20 to a shaft in the head stock so that the chuck and work piece are driven at an even multiple of the speed of the cam shaft. As will be more particularly described presently the cam shaft is arranged to feed the cutting tools transversely and longitudinally into thread cutting engagement with the work piece and retract the cutting tools in preparation for a successively deeper thread cutting operation once during each revolution of the cam shaft and while the work piece is making a greater number of complete revolutions as will be more particularly described presently.

Figure 2:
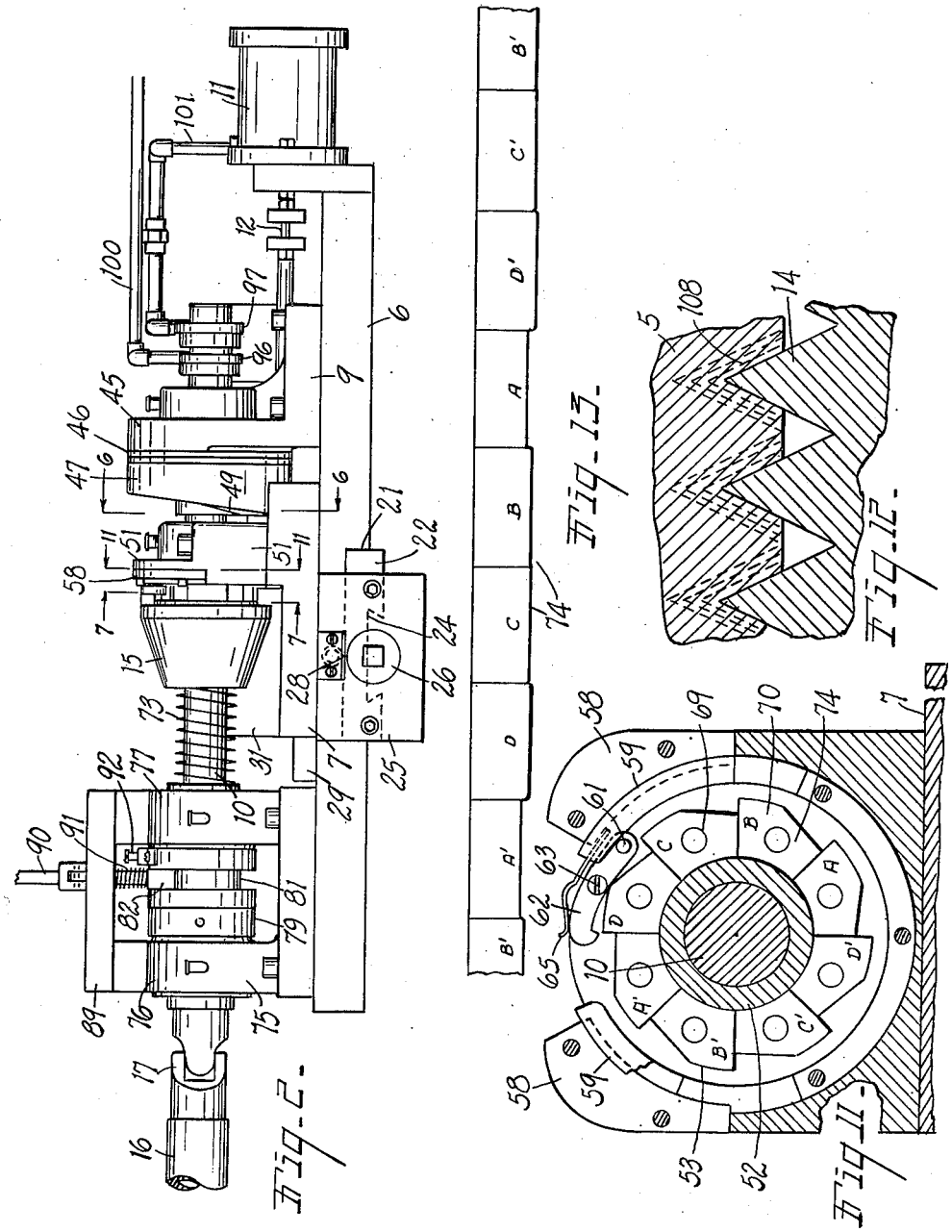
Fig. 2 is a fragmentary elevational view showing the tool carrying portions of my threading attachment.

Considering now the details of construction and mounting of the base plate 6 attention is directed to Figs. 2, 5 and 6. The base plate is generally rectangular covering the greater portion of the carriage 2 and extending longitudinally therebeyond on the far side of the carriage from the head stock 3. The base plate is transversely grooved or notched on its underside as at 21 to receive an adapter plate 22 which is secured thereto by suitable bolts 23. The adapter plate 22 defines a dove-tailed groove 24 along its underside which is arranged to fit the dove-tailed flange which is standard on most lathe carriages. The provision of the adapter plate 22 permits my base plate to be mounted on lathes having various sizes of carriages by providing adapter plates with different sizes of grooves.

As is shown most clearly in Figs. 2 and 6 the front edge of the base plate is provided with a stop plate 25 through which the adjusting screw 26 is threaded to abut against a hardened stop plate 27 on the lathe carriage 2. Stop screw 26 is serrated and engageable with a pointer 28 and acts to limit the transverse movement of the base plate toward the workpiece relative to the lathe carriage.

The top of the base plate is formed with the longitudinally extending dove-tailed flange 29 along the middle portion of its forward edge. The flange 29 is arranged to engage a mating dove-tailed slot 30 on the underside of the carriage plate 7. The carriage plate 7 is provided with a raised rear section 31, the rear face of which is notched as at 32 and slidably engageable with a guide bar 33 secured to the base plate which cooperates with the dove-tailed flange 29 in maintaining the alignment between the base plate and the carriage.

The raised portion 31 along the rear of the carriage plate defines a transversely extending dove-tailed slot 34 (see Fig. 8) at right angles to the flange 29 on the base plate which is arranged to receive a mating dove-tailed flange 35 on the underside of the tool holder 13. The forward face of the raised portion 31 is beveled or positioned at the oblique angle with respect to the cam shaft 10 as at 36 for purpose which will appear presently. The top surface of the raised portion is further grooved as at 37 along the bottom of the dove-tailed slot 34 to receive the lower end of a bolt 38 extending downwardly through the tool holder. A coil spring 39 positioned between the rear end of the slot 37 and the end of the bolt 38 constantly urges the tool holder and the tools carried thereby forwardly of the carriage and away from the work piece 5.

The forward edge of the tool holder 13 is beveled parallel to the front face of the raised portion 31 and is further slotted as at 40 (see Fig. 5) to receive a hardened steel follower bar 41 arranged to engage the cone shaped cam 15. The top surface of the tool holder is recessed as at 42 to receive the cutting tools 14 and as at 43 to receive adjusting screws for locating the cutting tools with respect to the tool holder. Clamps 44 are provided for holding the tools in the recesses 42. Two cutting tools are shown in the present instance for simultaneously cutting two threads at the intervals indicated but obviously other spacing or number of tools could be substituted for the arrangement shown.

At the right hand end of the longitudinal dove-tailed flange 29 on the bed plate there is provided the cam shaft bearing block 9 which is provided with an upstanding portion 45 in which is formed a bearing for the free end of the cam shaft 10. The left face of the bearing portion 45 is machined smooth and arranged to engage a pair of thrust washers 46 (see Figs. 3 and 4) which separate the bearing portion from a lead cam 47 which is keyed to the cam shaft 10 as at 48. The lead cam is provided with a cam surface 49 on its forward surface which is arranged to engage and act upon a follower block 50 of hardened steel bolted to the right hand end of the carriage plate 7. The cam surface 49 is raised uniformly throughout approximately 315 degrees of its circumference to cause a longitudinal advance of the carriage plate corresponding to the lead of the thread to be cut in the work piece multiplied by the gear ratio between the chuck and the cam shaft. The remaining 45 degrees of the circumference of the lead cam consists of a quick return surface to the starting point of the cam.

Secured to the right hand edge of the carriage 7 and aligned with the bearing bracket 45 on the base plate is a ratchet cam bearing bracket 51 which defines a central aperture through which the sleeve bearing 52 extends coaxially with the cam shaft 10 to form an additional bearing for the cam shaft. Since the ratchet cam bearing bracket is mounted on the carriage plate it will move axially along the cam shaft as the carriage plate is moved by the lead cam 47 and the follower block 50. The sleeve bearing 52 extends from the left hand face of the bracket 51 and forms a support for the ratchet cam member 53 which is rotatable thereon but which is restrained against rotation by a pair of spring pressed balls 54 carried in radial bores in the ratchet cam member and engageable with detents formed around the outer surface of the sleeve 52 at regular intervals. A thrust washer 55 is positioned around the cam shaft and between the left end of the bushing 52 and the right-hand face of the cone cam 15 to transmit the axial movement of the carriage 7 and ratchet bearing block 51 as well as axial movement of the ratchet cam to the cone cam and to prevent undue frictional force between the ratchet cam and the cone cam from overcoming the restraining action of the spring pressed balls 54 and rotating the ratchet cam.

The cone cam 15 which as was explained before engages the follower bar 41 on the tool holder is provided with a cone shaped raised portion throughout approximately 315 degrees of its circumference which is arranged to feed the tool holder 13 and tools 14 transversely into cutting engagement with the work piece. The remaining 45 degrees of the circumference of the cone cam is recessed as at 56 (see Fig. 5) and permits the coil spring 39 to retract the tool holder and tools from the work piece during a portion of the rotation of the cone cam and cam shaft. The cone cam is provided with key ways along its interior which are engageable with keys 57 on the cam shaft 10 so that the cone cam may be slid axially of the cam shaft while rotating therewith.

The retracting or depressed portion 56 of the cone cam 15 is angularly disposed relative to the surface 49 of the lead cam 47 in such a way that the follower bar 41 will drop into the retracting portion of the cone cam before the follower block 50 on the carriage plate drops into the return portion of the lead cam. It will be noted that both the cone cam and lead cam are keyed in fixed relative angular positions on the cam shaft 10. This arrangement permits the tool holder to retract the cutting tools from the threads cut in the work piece before the lead cam permits lateral retraction of the carriage and the tool holder by the air cylinder 11 which would otherwise strip the threads on the work piece.

Figure 3:
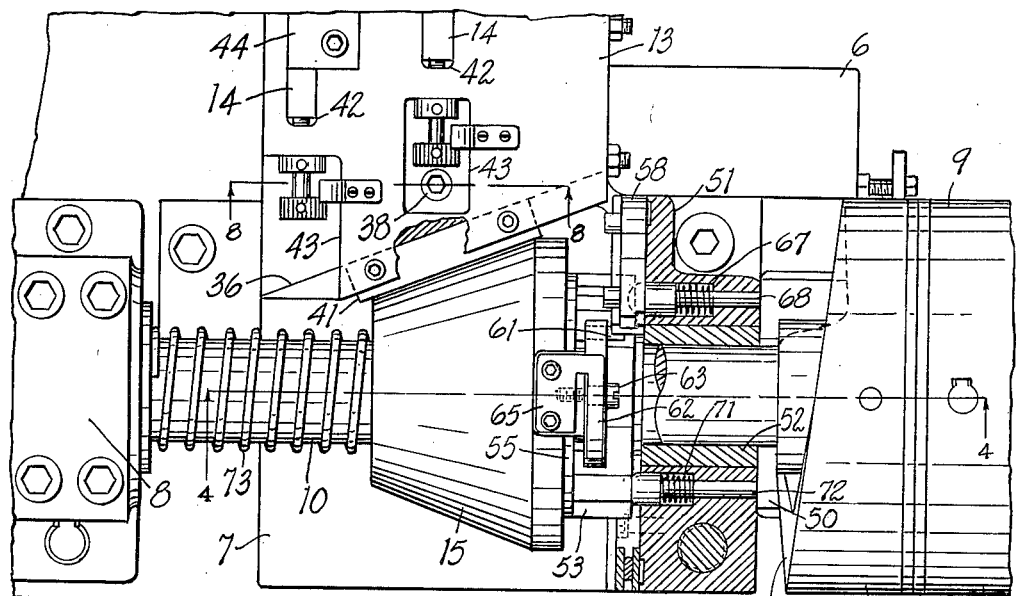
Fig. 3 is an enlarged fragmentary plan view partially broken away in cross section along the plane 3—3 in Fig. 4 showing the intermittent tool advancing mechanism of the attachment.
Figure 4:
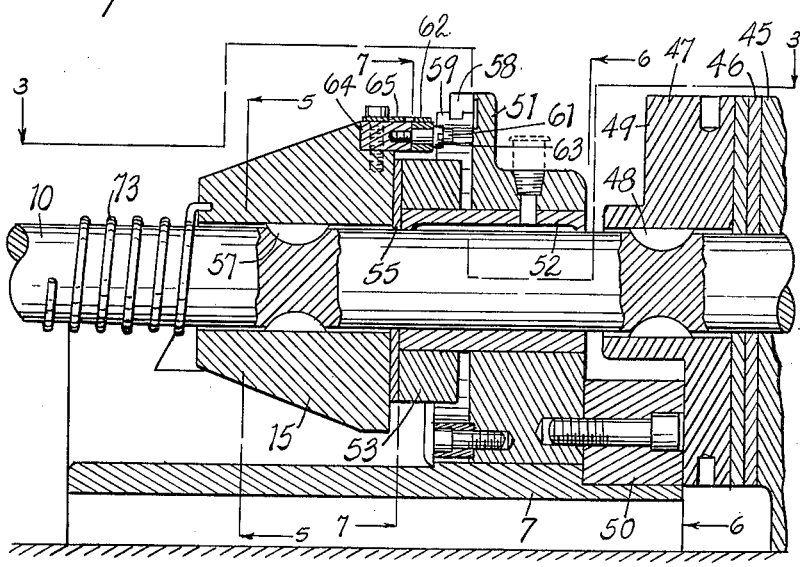
Fig. 4 is a fragmentary cross sectional view along the plane 4—4 in Fig. 3.

The left hand face of the ratchet bearing block 51 as shown in Figs. 3, 4 and 7 has bolted thereto a series of radially inwardly overhanging segmental clamp blocks 58 which engage and hold a segmental pin retractor rim 59 to the block 51. The retractor rim 59 extends around the cam shaft 10 and ratchet cam 53 for approximately 315 degrees and terminates at the top in smoothly curved surfaces as at 60. The retractor rim 59 is arranged to engage and depress the end of a pin 61 mounted on one end of a pawl 62 which is pivotally mounted on a pin 63 secured to a block 64 on the right hand face of the cone cam 15. A leaf spring 65 secured to the cone cam along with the block 64 constantly urges the hook end of the pawl 62 radially inwardly and tends to raise the pin 61 radially outwardly when not restrained by the retractor rim 59.

The spring pressed end of the pawl 62 is hooked and arranged to engage a series of eight radial notches 66 formed around the periphery of the ratchet cam 53. Thus during 45 degrees of the rotation of the cone cam the pin 61 will clear the retractor rim 59 and permit the pawl 62 to engage the ratchet cam and rotate the ratchet cam approximately 45 degrees before the pin 61 strikes the opposite curved edge 60 of the retractor rim and disengages the pawl from the ratchet cam. The positive rotating action of the cone cam 15 and pawl 62 will overcome the restraining force of the spring pressed balls 54 which prevent the ratchet cam from rotating on the sleeve 52 during the remainder of the rotation of the cone cam.

The left hand face of the ratchet cam bearing bracket 51 opposing the face of the ratchet cam is drilled as at 67 (see Fig. 3) to receive the spring pressed ball end pin 68 which is thus arranged to project outwardly of the bearing bracket and into locating engagement with one of the circular detent recesses 69 formed in each of the 8 cam faces 70 on the right hand face of the ratchet cam 53. The diametrically opposite side of the ratchet cam bearing bracket is similarly drilled as at 71 to receive a spring pressed pin 72 which bears against the diametrically opposed cam face of the ratchet cam from the ball pin 68. The pin 72 is not designed to enter the detents 69 but only to balance and aid the spring pressure of the pin 68 in urging the ratchet cam axially toward the cone cam along the sleeve bearing 52.

The spring pressed pins 68 and 72 thus act to press the ratchet cam 53 and, through the ratchet cam and the thrust washer 55, the cone cam 15 axially to the left along the cam shaft 10. A coil spring 73 positioned around the cam shaft and between the cone cam and the clutch bracket supplies a returning force to the cone cam and ratchet cam when the pins 68 and 72 move from high faces on the ratchet cam to low faces. The strength of the return spring 73 is sufficient to return the parts to starting position but is insufficient to overcome the combined strength of spring pressed pins 68 and 72 when these pins are in retracted fully loaded position against any of the cam faces 74. As is shown in Figs. 11 and 13 the right hand face of the ratchet cam is formed into four pairs of radially disposed, axially raised cam faces 74 lettered from A to D and A' to D'. The cam faces 74 are stepped successively upwardly or axially along the cam shaft 10 from low faces A and A' to high faces D and D'. The detent depressions 69 are similarly stepped being of equal depth in their individual faces.

The clutch mechanism 8 for connecting the cam shaft 10 to the telescopic shaft 16 is most clearly illustrated in Figs. 2, 10 and 10A. The clutch mechanism is mounted in a bracket 75 secured to an extension on the left hand edge of the base plate 6 and forming a driving shaft bearing 76 and a cam shaft bearing 77 which are spaced axially along the shafts. The left end of the cam shaft 10 is provided with a section of reduced diameter which is rotatably positioned within a mating socket in the clutch drive shaft 78. The clutch drive shaft is pin connected to a driving plate 79 while the cam shaft is pin connected to a driven plate 80 mounted adjacent to a driving plate. The driven plate defines an annular groove 81 therearound within which the throwout block 82 is arranged to ride. The driven plate is further drilled parallel to its axis to receive a clutch pin 83 with ears 84 formed on each side thereof. The clutch pin is arranged to extend through the lower portion of the annular groove 81 and is provided with a cam notch as at 85 engageable with a corresponding cam surface on the throwout block 82. The ears 84 on the clutch pin serve to maintain the clutch pin in non-rotative position relative to the driven plate so that the notch 85 always opens radially outwardly of the groove 81 for engagement with the throwout block. Coil springs 86 positioned behind the ears 84 in appropriate bores formed in the driven plate constantly urge the clutch pin 83 toward the left as shown in the drawings and into mating engagement with a bore 87 formed in the driving plate 79.

The throwout block 82 is secured to a lift pin 88 which extends upwardly through the top member 89 of the clutch bracket and is connected to a cammed hand lever 90 in such a way as to raise the lift pin and throwout block when the lever 90 is folded downwardly against the top of the clutch bracket. A coil spring 91 positioned between the throwout block and undersurface of the top member 89 constantly urges the lift pin and throwout block into clutch disengaging position.

An auxiliary lock-out pin 92 is carried on a bracket 93 on the outside of the driven plate 80 and is engageable with a bore 94 in the clutch pin 83 to retain the clutch pin 83 in retracted or disengaged position regardless of the position of the clutch lever 90. The auxiliary pin 92 is accessible through a bore 95 in the top member 89 of the clutch bracket.

Lifting the pin 88 and throwout block 82 by operation of the lever 90 permits the springs 86 to urge the clutch pin into engagement with the bore 87 in the driving plate to engage the two clutch plates and impart rotating motion to the cam shaft 10 from the driving clutch shaft 78 and the telescopic shaft 16. Lowering the pin 88 and throwout block 82 causes the cam face on the throwout block to engage the cam face 85 on the clutch pin and force the pin to the right as shown in the drawings and out of engagement with the bore 87 to disconnect the cam shaft from its power source.

Figures 14, 15:
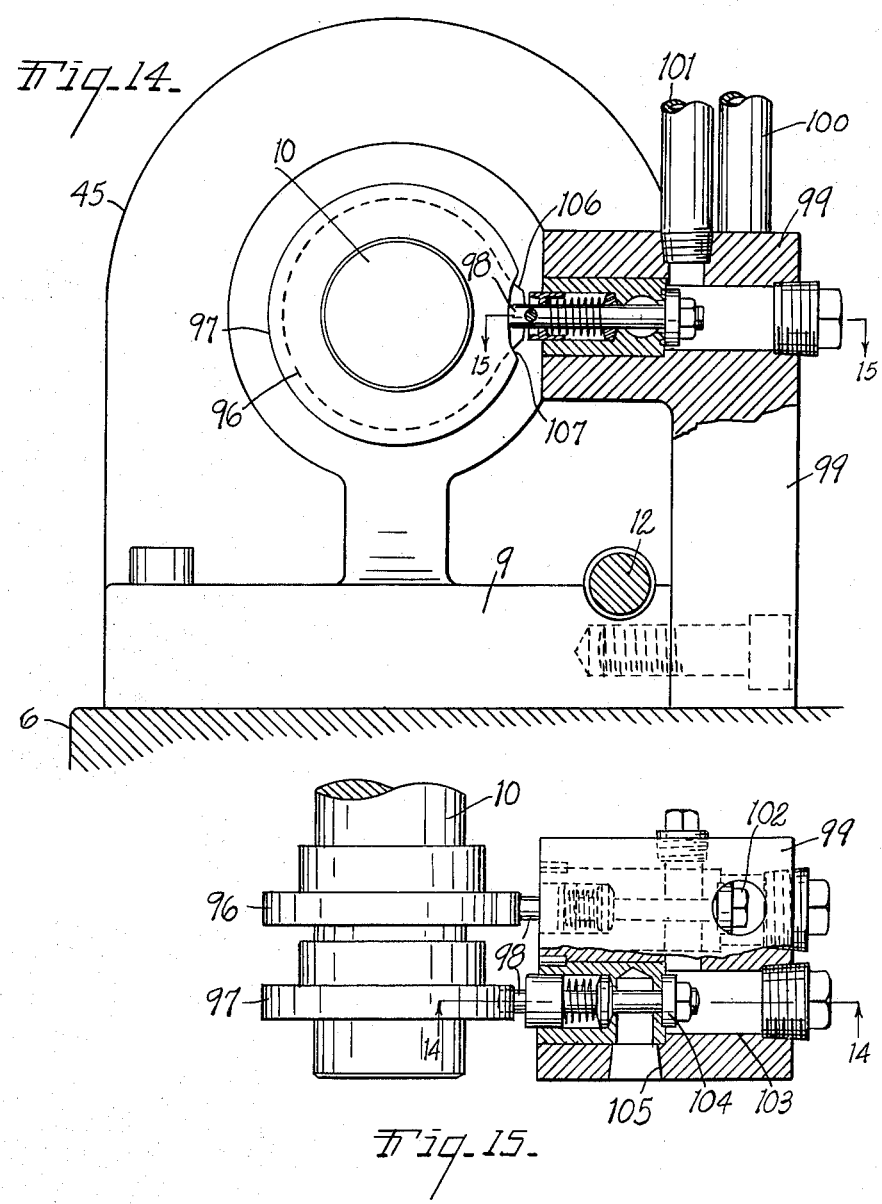
Fig. 14 is a fragmentary end elevational view partially broken away in cross section along the line 14—14 in Fig. 15 and showing the air valve mechanism for controlling the longitudinally retracting of the cutting tools.
Fig. 15 is a fragmentary plan view partially broken away along the plane 15—15 in Fig. 14.

The right hand or free end of the cam shaft 10 carries an air control cam 96 and an air exhaust cam 97 as is most clearly illustrated in Figs. 14 and 15. The cams 96 and 97 are mounted opposite the plungers 98 of a double air valve 99 secured to the side of the bearing bracket 9. The air valve 99 is provided with an air inlet pipe 100 and a cylinder supply pipe 101. Opening of the valve 102 by the air supply cam 96 permits air from the supply pipe 100 to pass through the valve cavity 103 to the cylinder supply pipe 101. Opening of the valve 104 by the cam 97 vents the valve cavity 103 to the exhaust port 105 to relieve the air pressure in the valve cavity and the air cylinder 11 through the pipe 101.

The air supply cam 96 is provided with a raised cam surface 106 along approximately 30 degrees of its perimeter while the exhaust cam 97 is provided with a depressed cam surface 107 throughout approximately 30 degrees of its perimeter. The cam surfaces 106 and 107 are positioned at the same angle with respect to the cam shaft 10 and are so disposed angularly with respect to the retracting surface 56 of the cone cam and the return surface 49 of the lead cam 47 that the cam surface 106 will open the air inlet valve 101 and the surface 107 will close the exhaust valve 104 immediately after the retracting surface 56 on the cone cam has permitted the retraction of the tool holder plate away from the work by the coil spring 39 and just after the peak of the lead cam has passed the follower block 50. Thus the air cylinder 11 will be actuated after the cutting tools 42 have completed a cut and cleared the work to positively retract the rod 12, carriage 7 and the tool holder 13 carried thereby. After the carriage has been retracted to its starting position the cams 96 and 97 will have rotated to reverse the position of the air valves 102 and 104 so that the air cylinder is vented through the exhaust port 105 and will not interfere with the action of the lead cam in moving the carriage to the left on a second stroke.

In operating the threading attachment the cutting tools 14 are properly adjusted with respect to the work piece 5 and a rough adjustment of the entire fixture relative to the work piece is accomplished by longitudinal and transverse movement of the lathe carriage to bring the tools to the starting point of the threads to be cut. This adjustment may be somewhat simplified and corrected transversely of the lathe by manipulation of the stop screw 26 on the base plate. The cam shaft 10 is then rotated until the lower faces A and A' on the ratchet cam 53 are engaged by the pins 68 and 72 at which time final adjustment of the cutting tools may be made by manipulation of the adjusted screws 43 on the tool holder. The clutch lever 90 is then operated to engage the clutch pin 83 to rotate the cam shaft at a proper fraction of the speed of the chuck and the work piece. The first step in the operation of the threading attachment is for the lead cam 47 to advance the carriage 7 and the tool holder carried thereby longitudinally of the work piece axis. Simultaneously the cone cam 15 due to the engagement of its raised portion with the follower bar 41 will hold the tool holder and tools transversely against the work piece as the work piece rotates and the cutting tools are carried longitudinally therealong forming a shallow thread cut in the work piece. This operation is indicated by the full lines in Fig. 12. Obviously, the slope or rise of the cam surface 49 of the lead cam must be predetermined from a consideration of the desired pitch of the thread and the number of turns to be cut since the lead cam must advance the tools longitudinally a distance equal to the pitch of the thread multiplied by the number of turns. The number of turns of the thread will, of course, be determined by the ratio of the gear train 20.

As the lead cam surface 49 nears the peak of its advance the retracting surface 56 of the cone cam will automatically be brought into engagement with the follower bar 41 permitting the tool holder to draw away from the work piece under the action of the coil spring 39. Immediately after the tools are retracted the air cams 96 and 97 will operate the air valve as previously explained to actuate the air cylinder 11 and retract the carriage 7 longitudinally of the lathe. Simultaneously with the retraction of the carriage 7 the pin 61 and pawl 62 carried by the cone cam will have cleared the gap in the retainer rim 59 so that the pawl will engage one of the notches 66 in the periphery of the ratchet cam. Continued rotation of the cone cam and the pawl will rotate the ratchet cam ⅛ of a revolution or approximately 45 degrees.

As was explained before the positive engagement of the pawl 62 with the ratchet cam will overcome the holding force of the spring pressed balls 54 in the detents in the sleeve 52 and the holding force of the ball end of the pin 68 in the detents 69 on the face of the ratchet cam. This rotation of the ratchet cam will bring the cam faces B and B' into engagement with the ball pin 68 and stop pin 72 and advance the ratchet cam 53 axially to the left along the sleeve 52. This axial movement of the ratchet cam will displace the thrust washer 55 and the cone cam 15 axially along the cam shaft 10 a distance equal to the difference in height between the cam faces A and B. Thus as the carriage 7 and tool holder 13 begin a second cycle to the left under the influence of the lead cam 49, the cone cam 15 due to its beveled engagement with the follower bar 41 and axially displaced position relative to the carriage plate will have transversely advanced the tool holder and cutting tools 14, a distance corresponding to the first dotted lines 108 in Fig. 12. Four successive cycles or rotations of the cam shaft 10 will thus make four successively deeper cuts to complete the threading operation, the pins 68 and 72 successively engaging the cam surface A, B, C, D and A', B', C', D'. The next rotation of the cam shaft 10 will bring the pins 68 and 72 into contact with the low cam faces A and A' permitting the coil spring 73 to retract the cone cam 15 axially to the right along the cam shaft 10 to start a new threading operation on a second work piece.

It should be noted that my threading attachment is capable of performing an infinite number of threading operations by simply changing the adjustment of the cutting tool or tools and substituting ratchet cam members 53 having various arrangements of cam faces thereon. Thus in working with soft metal the step variation between the successive lettered cam faces would be made greater and the number of faces reduced while in hard metal the variation would be reduced. A new retainer ring 59 with a gap length appropriate to the new ratchet cam must also be installed. If greater pitch is desired in the threads cut, a lead cam 49 having a higher cam surface may be substituted and if more turns are desired in the thread, the ratio of the gear train 20 may be increased.

In the modified form of attachment illustrated in Figs. 16 and 17 the base plate 109 is attached to the carriage 110 by bolts 111 and supports an end bearing block 112, clutch assembly 113 and carriage plate 114 in the same manner as in the preferred form of the invention. The carriage plate 114 supports a ratchet cam bearing block 115 and a tool holding plate 116 which in this modified form is mounted at an oblique angle with respect to the cam shaft 117. The tool holder 116 is arranged to support a cutting tool 118 having a plurality of cutting points 119, 119A, 119B, etc., the number of teeth being determined by the length of thread to be cut. The tool holder 116 engages and is arranged to be advanced by the cone cam 120 as in the preferred form of the invention but due to the oblique mounting relative to the cam shaft 117 the tool 118 will be advanced both transversely and longitudinally with respect to the work piece by rotation of the cone cam. The line of advance of the tool holder and the tool is parallel to the right hand edges of the cutting points so that the points cut only on their left edges. The points are spaced apart a distance equal to the pitch of one turn of the thread being cut.

A ratchet cam member 121 is mounted in the ratchet cam bearing block in the same manner as in the preferred form of the invention and a lead cam member 122 is provided for longitudinally advancing the carriage 114. It should be noted, however, that the cam surface 123 of the lead cam is much lower than in the preferred form of the invention since the multiple cutting edges 119 eliminate the necessity for advancing the tool holder completely across the threaded portion of the work piece. In operation, the thread cut by the point 119 overtakes and joins the thread cut simultaneously by point 119A, etc.

Since the multiple cutting edges need only be advanced through a distance equal to the pitch of one turn of the thread being cut plus an overrun to smoothly join the sections of the thread, the gear train 124 is arranged to drive the cam shaft 117 at one-half the speed of the chuck and work piece. The ratio between the cam shaft and the work piece must be an even multiple so that the starting points of the several threads will be located opposite the cutting edges on each successive pass or cut of the tool. Since the longitudinal movement of the carriage is so short the necessity of the air cylinder in the preferred form of the invention is eliminated and the coil spring 125 around the cam shaft is relied upon to return the cone cam and the carriage to their starting position. As in the first form of the machine, the return spring 125 at all times presses the cone cam 120 and ratchet cam 121 to a predetermined loaded condition and position of the backing springs and pins that act against the cam faces of the ratchet cam.

In operation the cone cam will hold the cutting points 119, 119A, etc. in cutting engagement as shown in Fig. 17 during slightly less than two revolutions of the work piece, the thread initially cut by the point 119A being overtaken by the cutting point 119 at the completion of one revolution of the work. The cone cam and lead cam will then retract the cutting tool and the carriage while the ratchet cam advances the cone cam axially on the cam shaft. On the second pass of the tool the cone cam will advance all of the cutting points to the lines indicated at 126 for a second deeper cut and the machine will automatically make successively deeper cuts until the ratchet cam has completed one cycle or revolution. It should be noted that the combined longitudinal and transverse movement of the tool holder and cutting tool results in an oblique advance of the cutting points relative to the work piece along the lines 127 so that substantially all of the cutting action takes place along the left hand edges of the cutting points. It will be noted that the relative alignment of the cutting points of 119 may be easily retained while sharpening only the left hand edges of the cutting points.

As in the preferred form of the invention the speed of the cut may be changed by substituting ratchet cam members 121 with different cam faces and the pitch of the thread may be changed by changing the height of the lead cam 122 and the spacing of the points 119.

Both forms of the invention permit a standard lathe to be converted into a semi-automatic threading machine at materially reduced expense under the cost of a complete threading machine. The threading attachments permit relatively unskilled machinists to produce accurately turned threads in a short time thus reducing the cost of the threaded articles.

Having thus described my invention, what I claim as new and desire to secure by Letters Patent, is:

1. A threading attachment for a lathe comprising a base plate, an adapter plate secured thereto and having a dove-tail slot engageable with the carriage of the lathe, a cam shaft supported on said base plate, a gear train and telescopic shaft connected to drive said telescopic shaft from said lathe at a fraction of the speed of said lathe determined by the number of turns of the thread to be cut, a manually operable clutch interposed between and operative to connect said cam shaft and said telescopic shaft, a carriage plate having a dove-tailed tongue and groove connection with said base plate for relative movement therebetween axially of said lathe, a lead cam mounted on said cam shaft and engageable with said carriage plate to advance said carriage plate on said base plate through a distance equal to the lead of the thread to be cut times the ratio of the speed of said chuck to the speed of said cam shaft, an air cylinder mounted on said base plate and having a piston connected to said carriage plate to retract said carriage plate after each advance thereof, a tool holder having a dove-tailed tongue and groove engagement with said carriage plate for sliding motion transversely with respect to said carriage plate and base plate, a plurality of cutting tools carried on said tool holder, a cone shaped cam rotatable with said cam shaft and having a raised cam surface engageable with said tool holder to impart transverse movement to said tool holder toward the chuck of said lathe and a lowered tool retracting surface, a ratchet cam having a plurality of diametrically opposed pairs of progressively raised cam surfaces disposed around the axis of said cam shaft, a bearing structure on said carriage plate forming an exterior bearing for said cam shaft and an interior bearing for said ratchet cam, spring pressed detents in said ratchet cam engageable with said bearing structure, pins carried by said bearing structure successively engageable with said pairs of cam faces on said ratchet cam to effect axial displacement of said ratchet cam along said cam shaft, said ratchet cam having a thrust engagement with said cone cam to impart axial movement thereto relative to said carriage plate, a pawl carried by said cone cam and engageable with said ratchet cam to impart rotating motion thereto and overcome said detents, a retainer member carried on said bearing structure engageable with said pawl to disengage said pawl from said ratchet cam member except during a fractional portion of the rotation of said cone cam equal to the reciprocal of the number of pairs of cam surfaces on said ratchet cam, a spring urging said cone cam and ratchet cam toward said pins on said bearing structure, an air control valve for controlling the operation of said air cylinder, and control cams on said cam shaft for operating said air valve, said retainer member, cone cam, lead cam and air control cams being relatively angularly disposed about said cam shaft to effect retraction of said carriage plate and rotation of said ratchet cam member after said tool holder is retracted transversely and before said carriage plate commences a second operation.

2. A threading attachment for a lathe comprising a base plate, an adapter plate secured thereto and adjustably engageable with the carriage of the lathe, a cam shaft supported on said base plate, a gear train and telescopic shaft connected to drive said telescopic shaft from said lathe in a ratio to the speed of the chuck of said lathe equal to the reciprocal of the number of turns of the thread to be cut, a manually operable clutch interposed between and operative to connect said cam shaft and said telescopic shaft, a carriage plate having a tongue and groove connection with said base plate for relative movement therebetween axially of said lathe, a lead cam mounted about said cam shaft and arranged to advance said carriage plate on said base plate through a distance equal to the length of thread to be cut during each revolution of said cam shaft, an air cylinder mounted on said base plate and having a piston connected to said carriage plate to retract said carriage plate after each advance thereof, a tool holder having a tongue and groove engagement with said carriage plate for sliding motion transversely with respect to said carriage plate and base plate, a plurality of cutting tools carried on said tool holder, a cone cam rotatable with said cam shaft and having a raised cam surface engageable with said tool holder to impart transverse advancing movement to said tool holder and a lowered surface permitting transverse retraction of said tool holder, said cone cam and tool holder being engageable along a line oblique to said cam shaft, a ratchet cam mounted around said cam shaft and having a plurality of progressively axially raised cam surfaces on one end thereof, a bearing structure on said carriage plate forming a bearing for said cam shaft and said ratchet cam, a spring pressed stop member carried by said bearing structure successively engageable with said cam faces on said ratchet cam to effect axial displacement of said ratchet cam along said cam shaft, said ratchet cam having a thrust engagement with said cone cam to impart axial movement thereto, a pawl carried by said cone cam and engageable with said ratchet cam to impart rotating motion thereto, a retainer member carried on said bearing structure engageable with said pawl to disengage said pawl from said ratchet cam member except during a fixed portion of the rotation of said cone cam necessary to advance one of said cam faces on said ratchet cam over said stop member, an air control valve for controlling the operation of said air cylinder, and control cams rotatable in timed relationship with said cam shaft for operating said air valve, said retainer member, cone cam, lead cam and air control cam being relatively angularly disposed to effect retraction of said carriage plate and rotation of said ratchet cam member after said tool holder is retracted and before said carriage plate commences a second operation.

3. A threading attachment for a lathe comprising a base plate, an adapter plate secured thereto and engageable with the carriage of the lathe, a cam shaft supported on said base plate, a gear train and telescopic shaft connected to drive said telescopic shaft from said lathe at a fraction of the speed of the chuck of said lathe, a manually operable clutch interposed between and operative to connect the said cam shaft and said telescopic shaft, a carriage plate mounted on said base plate for relative movement therebetween axially of said lathe, a lead cam mounted on said cam shaft and arranged to advance said carriage plate on said base plate once during each revolution of said cam shaft, an air cylinder mounted on said base plate and arranged to retract said carriage plate after each advance thereof, a tool holder mounted on said carriage plate for sliding motion transversely with respect to said carriage plate and base plate, a spring acting between said carriage plate and tool holder to retract said tool holder, a cutting tool carried on said tool holder, a cone cam rotatable with said cam shaft and having a raised cam surface arranged to advance said tool holder and a lower surface permitting transverse retraction of said tool holder, a ratchet cam having a plurality of progressively axially raised cam surfaces disposed around the axis of said cam shaft, a bearing structure on said carriage plate forming a bearing for said cam shaft and said ratchet cam, a stop member carried by said bearing structure successively engageable with said cam faces on said ratchet cam to effect axial displacement of said ratchet cam along said cam shaft, said ratchet cam being cooperable with said cone cam to impart axial movement thereto relative to said tool holder, a pawl rotatable with said cam shaft and engageable with said ratchet cam to impart rotating motion thereto, a retractor member carried on said carriage plate arranged to disengage said pawl from said ratchet cam member except during a fixed portion of the rotation of said cone cam necessary to advance one face on said ratchet cam over said stop member, an air control valve for controlling the operation of said air cylinder, and control cams rotatable in timed relationship with said cam shaft for operating said air valve, said retractor member, cone cam, lead cam and air control cams being relatively angularly disposed to effect retraction of said carriage plate and rotation of said ratchet cam member after said tool holder is retracted and before said carriage commences a second advance.

4. In a threading attachment for a lathe the combination of an axially movable carriage, a cam shaft rotatably mounted over said carriage, a tool holding member slidably mounted on said carriage for motion at right angles to said cam shaft, a conical cam member continuously rotatable with said cam shaft and slidable axially therealong, said cam member having a raised cam surface throughout approximately 315 degrees engageable with said tool holding member to force said tool holding member into cutting position, said cam having a depressed surface throughout the remainder of its surface arranged to permit said tool holding member to be retracted from work engaging position, a spring positioned between said carriage and said tool holding member and arranged to urge said tool holding member out of working position, a bearing block for said cam shaft mounted on said carriage, a sleeve positioned in said bearing block and around said cam shaft, a ratchet cam member rotatably mounted on said sleeve and arranged coaxially with said conical cam to impart axial movement thereto, a plurality of pairs of axially stepped angularly disposed cam surfaces formed on an end of said ratchet cam, spring pressed pins positioned on diametrically opposed sides of said bearing block and engageable with said pairs of cam faces for moving said ratchet cam axially along said sleeve, a pawl pivotally mounted near the periphery of said cone cam and spring urged toward engagement with said ratchet cam, and a retainer mounted on said bearing block engageable with said pawl to disengage said pawl from said ratchet cam during approximately 315 degrees of rotation of said cone cam.

5. In a threading attachment for a lathe the combination of a carriage movable longitudinally of the lathe, a cam shaft rotatably mounted over said carriage and parallel to the line of movement of said carriage, a tool holding member slidably mounted on said carriage for motion transversely of said lathe, a conical cam member continuously rotatable with said cam shaft and slidable axially therealong, said cam member having a raised cam surface throughout the greater part of its surface engageable with said tool holding member to force said tool holding member into cutting position, said cam having a depressed surface throughout the remainder of its surface arranged to permit said tool holder member to be retracted from work engaging position, a spring positioned between said carriage and said tool holding member and arranged to urge said tool holding member out of working position, a bearing block for said cam shaft mounted on said carriage, a sleeve positioned in said bearing block and around said cam shaft, a ratchet cam member rotatably mounted on said sleeve and engageable axially with said conical cam to impart axial movement thereto, a plurality of stepped cam surfaces formed on an axial face of said ratchet cam, a pin positioned on said bearing block and successively engageable with said stepped cam surfaces for moving said ratchet cam axially along said sleeve, a pawl pivotally mounted near the periphery of said cone cam and spring urged toward engagement with said ratchet cam, and a rim mounted on said bearing block engageable with said pawl to disengage said pawl from said ratchet cam during the time said tool holding member is in work engaging position.

6. In a threading attachment for a lathe the combination of a carriage movable longitudinally of the lathe, a cam shaft rotatably mounted over said carriage, a tool holding member slidably mounted on said carriage for motion at right angles to said cam shaft, a first cam member continuously rotatable with said cam shaft and slidably axially therealong said cam member having a raised cam surface throughout the greater part of its surface engageable with said tool holding member to force said tool holding member into cutting position, said cam having a depressed surface throughout the remainder of its surface arranged to permit said tool holder member to be retracted from work engaging position, a spring positioned between said carriage and said tool holding member and arranged to urge said tool holding member out of working position, a bearing block for said cam shaft mounted on said carriage, a ratchet cam member rotatably mounted on said bearing block and operable axially with said cone cam to impart axial movement thereto, a plurality of axially stepped cam surfaces formed on an axial face of said ratchet cam, a spring pressed stop positioned on said bearing block and successively engageable with said axially stepped cam surfaces for moving said ratchet cam axially, a pawl rotatable with said cam shaft and spring urged toward engagement with said ratchet cam, and a rim mounted on said bearing block engageable with said pawl to disengage said pawl from said ratchet cam during the time the raised portion of said first cam is engaged with said tool holding member, said first cam engaging said tool holding member along a line oblique to said cam shaft.

7. In a threading attachment for a lathe, a longitudinally movable carriage adapted to be mounted on a lathe, a transversely movable tool holder mounted on said carriage, a cam shaft, a lead cam on said shaft arranged to effect movement of said carriage, a fixed member on said carriage and extending around said cam shaft, a bushing extending through said fixed member and around said cam shaft, a ratchet cam member rotatable on said bushing, spring pressed detents restraining said ratchet cam against rotation, a plurality of axially stepped cam surfaces on said ratchet cam opposing said fixed member, a spring pressed stop mounted in said fixed member and successively engageable with said cam surfaces to impart axial motion to said ratchet cam, said spring pressed stop having a ball and detent engagement with said cam surfaces, a second cam rotatable with said cam shaft and having a cam surface arranged to impart transverse motion to said tool holder upon rotation of said second cam, a thrust bearing positioned between said second cam and said ratchet cam to transmit axial motion therebetween, a pawl carried by said second cam and spring urged toward engagement with said ratchet cam, and a pawl disengaging band carried on said fixed member arranged to hold said pawl in disengaged position except during a fraction of the rotation of said second cam equal to the reciprocal of the number of cam faces on said ratchet cam, said second cam having an oblique engagement with said tool holder whereby axial movement of said ratchet cam and second cam imparts transverse movement to said tool holder.

8. In a threading attachment for a lathe, a longitudinally movable carriage adapted to be mounted on a lathe, a transversely movable tool holder mounted on said carriage, a cam shaft, a lead cam on said shaft arranged to effect movement of said carriage, a fixed member on said carriage and extending around said cam shaft, a bushing extending through said fixed member and around said cam shaft, a ratchet cam member rotatable on said bushing, spring pressed detents restraining said ratchet cam against rotation, a plurality of axially stepped cam surfaces on said ratchet cam opposing said fixed member, a stop mounted in said fixed member and successively engageable with said cam surfaces to impart axial motion to said ratchet cam, a second cam rotatable with said cam shaft and having a cam surface arranged to impart transverse motion to said tool holder upon rotation of said second cam, a pawl carried by said second cam and spring urged toward engagement with said ratchet cam, and a pawl disengaging band carried on said fixed member arranged to hold said pawl in disengaged position except during a fraction of the rotation of said second cam equal to the reciprocal of the number of different cam faces on said ratchet cam, said second cam having an oblique engagement with said tool holder whereby axial movement of said ratchet cam and second cam imparts transverse movement to said tool holder.

9. A threading attachment for a lathe having a chuck comprising, a base, a carriage slidable on said base longitudinally of said base, a tool holder mounted on said carriage and slidable transversely of said base, a cam shaft mounted on said base, a fixed member mounted on said carriage and around said cam shaft, a lead cam secured to said cam shaft and arranged to advance said carriage through the length of the thread to be cut, a second cam rotatable with said cam shaft and slidable axially therealong, said second cam having an oblique engagement with said tool holder and arranged to advance said tool holder transversely upon rotary and axial movement with respect thereto, said second cam having a raised surface to advance said tool holder before the advance of said carriage, a ratchet cam interposed between said fixed member and said second cam, said ratchet cam having a plurality of pairs of diametrically disposed axially stepped cam faces, spring pressed stop members carried by said fixed member and successively engageable with the pairs of cam faces on said ratchet cam to effect axial displacement thereof, a spring operable on said second cam opposing the action of said ratchet cam, a pawl carried by said second cam and engageable with said ratchet cam to rotate said ratchet cam therewith, pawl disengaging flanges on said fixed member rendering said pawl ineffective except during a fraction of the rotation of said second cam equal to the reciprocal of the number of pairs of cam faces on said ratchet cam, and driving mechanism including a gear train connectable with said lathe for driving said cam shaft from said lathe, said gear train being arranged to drive said cam shaft in a ratio with said chuck equal to reciprocal of the number of turns in the thread to be cut.

10. A threaded attachment for a lathe having a chuck comprising, a base, a carriage slidable on said base longitudinally of said base, a tool holder mounted on said carriage and slidable transversely of said base, a cam shaft mounted on said base, a fixed member mounted on said carriage and around said cam shaft, a lead cam secured to said cam shaft and arranged to advance said carriage through the length of the thread to be cut, a second cam rotatable with said cam shaft and slidable axially therealong, said second cam having an oblique engagement with said tool holder and arranged to advance said tool holder transversely upon rotary and axial movement with respect thereto, said second cam having a raised surface to advance said tool holder before the advance of said carriage, a ratchet cam interposed between said fixed member and said second cam, said ratchet cam having a plurality of axially stepped cam faces, stop members carried by said fixed member and successively engageable with the cam faces on said ratchet cam to effect axial displacement thereof, a spring operable on said second cam opposing the action of said ratchet cam, a pawl carried by said second cam and engageable with said ratchet cam to rotate said ratchet cam therewith, pawl disengaging flanges on said fixed member rendering said pawl ineffective during a fraction of the rotation of said second cam, and driving mechanism including a gear train connectable with said lathe for driving said cam shaft from said lathe.

11. In combination with a lathe having a movable carriage and a power driven chuck, a base plate mounted on said carriage, a cam shaft journaled on said base plate, a gear train and telescopic shaft connected to a power source in said lathe connected to drive said cam shaft at a fraction of the speed of said chuck corresponding to the number of turns of a thread to be cut, a clutch on said base plate interposed between said telescopic shaft and said cam shaft, a carriage plate on said base plate slidable thereon parallel to said cam shaft, a lead cam continuously rotatable on said cam shaft arranged to advance and permit return of said carriage plate once in each revolution of said cam shaft through a distance equal to the pitch of the thread to be cut times the number of turns of the thread, a tool holder on said carriage plate and slidable relative thereto at right angles to said cam shaft, a second cam continuously rotatable with said cam shaft and movable axially thereof with said carriage plate, said second cam having tool holder advancing and retracting surfaces thereon, a ratchet cam member mounted on said carriage plate and having a plurality of angularly disposed axially stepped cam faces arranged to advance said second cam relative to said carriage plate, said second cam and tool holder being engageable along a line oblique to said cam shaft whereby axial motion of said second cam imparts transverse motion to said tool holder, a pawl carried on said second cam arranged to rotate said ratchet cam over one of said stepped cam surfaces once during each revolution of said cam shaft, said pawl being operable only when said tool holder is in retracted position, and fluid pressure mechanism carried on said base plate arranged to retract said carriage plate when said tool holder is in retracted position.

12. In combination with a lathe having a movable carriage and a power driven chuck, a base plate mounted on said carriage, a cam shaft journaled on said base plate parallel to the axis of said chuck, a gear train and telescopic shaft connected to a power source in said lathe connected to drive said cam shaft at a fraction of the speed of said chuck, a clutch interposed between said power source and said cam shaft, a carriage plate on said base plate slidable thereon parallel to said cam shaft, a lead cam continuously rotatable on said cam shaft arranged to advance and permit return of said carriage plate once in each revolution in said cam shaft through a distance equal to the length of the thread to be cut, a tool holder on said carriage plate and slidable relative thereto at right angles to said cam shaft, a second cam continuously rotatable with said cam shaft and movable axially thereof with said carriage plate, said second cam being engageable with said tool holder to effect transverse movement thereof on rotary and axial motion of said second cam, a ratchet cam member mounted on said carriage plate and having a plurality of stepped cam faces arranged to advance said second cam relative to said carriage plate, a pawl rotatable with said cam shaft and arranged to rotate said ratchet cam over one of said stepped cam surfaces once during each revolution of said cam shaft, said pawl being operable only when said tool holder is in retracted position, and fluid pressure mechanism carried on said base plate arranged to retract said carriage plate when said tool holder is in retracted position.

13. In combination with a lathe having a movable carriage and a power driven chuck, a base plate mounted on said carriage, a cam shaft journaled on said base plate, a gear train and telescopic shaft connected to a power source in said lathe connected to drive said cam shaft at a fraction of the speed of said chuck, a clutch interposed between said power source and said cam shaft, a carriage plate on said base plate slidable thereon parallel to said cam shaft, a lead cam continuously rotatable on said cam shaft arranged to advance and return said carriage plate once in each revolution of said cam shaft, a tool holder on said carriage plate and slidable relative thereto at right angles to said cam shaft, a second cam continuously rotatable with said cam shaft and movable axially thereof with said carriage plate, a ratchet cam member mounted on said carriage plate and having a plurality of axially stepped cam faces arranged to advance said second cam relative to said carriage plate, and a pawl rotatable with said cam shaft and arranged to rotate said ratchet cam over one of said stepped cam surfaces once during each revolution of said cam shaft, said pawl being operable only when said tool holder is in retracted position.

14. A threading attachment for a lathe comprising in combination a base plate adapted to be mounted on the carriage of said lathe, a cam shaft journaled on said base plate to be parallel to the axis of said lathe when said base plate is mounted on said carriage of said lathe, a carriage plate slidably mounted on said base plate for motion parallel to said cam shaft, a tool holder slidably mounted on said carriage plate at right angles to the motion of said carriage plate, a lead cam rotatable with said cam shaft and arranged to advance said carriage plate once during each revolution of said cam shaft, a cone cam mounted on said cam shaft and slidable axially therealong with said carriage plate, said cone cam having cam surfaces engageable with said tool holder to transversely advance said tool holder into working engagement before said carriage plate is advancing and to permit retraction of said tool holder before said carriage plate is retracted, a ratchet cam carriage around said shaft and movable with said carriage plate, said ratchet cam having a series of axially raised faces arranged to locate said cone cam axially with respect to said carriage plate, and a pawl carried by said cone cam arranged to rotate said ratchet cam during that portion of the rotation of said cone cam when said tool holder is in retracted position.

15. A threading attachment for a lathe comprising in combination a base plate adapted to be mounted on the carriage of said lathe, a cam shaft journaled on said base plate to be parallel to the axis of said lathe when said base plate is mounted on said carriage of said lathe, a carriage plate slidably mounted on said base plate for motion parallel to said cam shaft, a tool holder slidably mounted on said carriage plate for motion at right angles to the motion of said carriage plate, a lead cam rotatable with said cam shaft and arranged to advance said carriage plate once during each revolution of said cam shaft, a cone cam mounted on said cam shaft and slidable axially therealong with said carriage plate, said cone cam having a cam surface engageable with said tool holder to advance said tool holder into working engagement while said carriage plate is advancing and to retract said tool holder before said carriage plate is retracted, a ratchet cam movable with said carriage plate, said ratchet cam having axially raised faces arranged to locate said cone cam in a plurality of positions axially with respect to said carriage plate, and a pawl rotatable with said cam shaft arranged to rotate said ratchet cam during that portion of the rotation of said cone cam when said tool holder is in retracted position.

16. A threading attachment for a lathe comprising in combination a base plate adapted to be mounted on the carriage of said lathe, a cam shaft journaled on said base plate, a carriage plate slidably mounted on said base plate parallel to the axis of said lathe when said base plate is mounted on said carriage of said lathe, a tool holder slidably mounted on said carriage plate to slide at right angles to said carriage plate, a lead cam rotatable with said cam shaft and arranged to advance said carriage plate once during each revolution of said cam shaft, a second cam mounted on said cam shaft and slidable axially therealong with said carriage plate, said second cam having a cam surface engageable with said tool holder to advance said tool holder into working engagement before said carriage plate is advanced and to retract said tool holder before said carriage plate is retracted, a ratchet cam carried on said carriage plate and movable therewith, said ratchet cam having axially raised faces arranged to locate said second cam axially with respect to said carriage plate, and a pawl rotatable with said cam shaft arranged to rotate said ratchet cam during that portion of the rotation of said second cam when said tool holder is in retracted position, said second cam having an oblique engagement with said tool holder whereby axial motion of said second cam imparts transverse motion to said tool holder.

17. A threading attachment for a lathe having a chuck comprising a base, a carriage slidable on said base longitudinally of said base, a tool holder mounted on said carriage and slidable at an angle with respect thereto, a cam shaft mounted on said base, a fixed member mounted on said carriage and around said cam shaft, a lead cam secured to said cam shaft and arranged to advance said carriage, a second cam rotatable with said cam shaft and slidable axially therealong, said second cam having an oblique engagement with said tool holder and arranged to advance said tool holder upon rotary and axial movement with respect thereto, said second cam having a raised surface to advance said tool holder during the advance of said carriage, a ratchet cam interposed between said fixed member and said second cam, said ratchet cam having a plurality of axially stepped cam faces, a spring pressed stop member carried by said fixed member and successively engageable with the cam faces on said ratchet cam to effect axial displacement thereof, a spring operable on said second cam opposing the action of said ratchet cam, a pawl carried by said second cam and engageable with said ratchet cam to rotate said ratchet cam therewith, pawl disengaging flanges on said fixed member rendering said pawl ineffective except during a fraction of the rotation of said second cam, and driving mechanism including a gear train connectable with said lathe for driving said cam shaft from said lathe.

18. A threading attachment for a lathe having a chuck comprising a base, a carriage slidable on said base longitudinally of said base, a tool holder mounted on said carriage and slidable at an angle with respect thereto, a cam shaft mounted on said base, a fixed member mounted on said carriage and around said cam shaft, a lead cam secured to said cam shaft and arranged to advance said carriage, a second cam rotatable with said cam shaft and slidable axially therealong, said second cam having an oblique engagement with said tool holder and arranged to advance said tool holder upon rotary and axial movement with respect thereto, said second cam having a raised surface to advance said tool holder during the advance of said carriage, a ratchet cam interposed between said fixed member and said second cam, said ratchet cam having a plurality of axially stepped cam faces, a stop member carried by said fixed member and successively engageable with the cam faces on said ratchet cam to effect axial displacement thereof, a spring operable on said second cam opposing the action of said ratchet cam, a pawl carried by said second cam and engageable with said ratchet cam to rotate said ratchet cam therewith, pawl disengaging flanges on said fixed member rendering said pawl ineffective except during a fraction of the rotation of said second cam, and driving mechanism including a gear train connectable with said lathe for driving said cam shaft from said lathe.

19. In a threading attachment for a lathe, a base and a longitudinally movable carriage and a tool holder movable at an angle relative to said carriage, a cam shaft, a lead cam on said shaft arranged to effect movement of said carriage, a fixed member on said carriage and extending around said cam shaft, a bushing extending through said fixed member and around said cam shaft, a ratchet cam member rotatable on said bushing, spring pressed detents restraining said ratchet cam against rotation, a plurality of axially stepped cam surfaces on said ratchet cam opposing said fixed member, a spring pressed stop mounted in said fixed member and successively engageable with said cam surfaces to impart axial motion to said ratchet cam, said spring pressed stop having a ball and detent engagement with said cam surfaces, a second cam rotatable with said cam shaft and having a cam surface arranged to impart motion to said tool holder upon rotation of said second cam, a thrust bearing positioned between one end of said second cam and said ratchet cam to transmit axial pressure therebetween, a pawl carried by said second cam and spring urged toward engagement with said ratchet cam, and a pawl disengaging band carried on said fixed member arranged to hold said pawl in disengaged position except during a fraction of the rotation of said second cam equal to the reciprocal of the number of cam faces on said ratchet cam, said second cam having an oblique engagement with said tool holder whereby axial movement of said ratchet cam and second cam imparts movement to said tool holder.

20. In a threading attachment for a lathe, a base and a longitudinally movable carriage and a tool holder movable at an angle relative to said carriage, a cam shaft, a lead cam on said shaft arranged to effect movement of said carriage, a fixed member on said carriage and extending around said cam shaft, a bushing extending through said fixed member and around said cam shaft, a ratchet cam member rotatable on said bushing, spring pressed detents restraining said ratchet cam against rotation, a plurality of axially stepped cam surfaces on said ratchet cam opposing said fixed member, a spring pressed stop mounted in said fixed member and successively engageable with said cam surfaces to effect axial displacement of said ratchet cam, a second cam rotatable with said cam shaft and having a cam surface arranged to impart motion to said tool holder upon rotation of said second cam, a pawl carried by said second cam and spring urged toward engagement with said ratchet cam, and a pawl disengaging band arranged to hold said pawl in disengaged position except during a fraction of the rotation of said second cam, said second cam having an oblique engagement with said tool holder whereby axial movement of said ratchet cam and second cam imparts movement to said tool holder.

21. Intermittently operating tool advancing mechanism comprising a cam shaft, a bearing for said shaft, a tool holder, a cam member rotatable with said shaft and operable to engage and advance said tool holder by rotary and axial motion, a ratchet cam member positioned around said shaft and between said first cam member and bearing, said ratchet cam having a plurality of pairs of progressively and axially stepped cam faces opposing said bearing, said faces having detents formed therein, a plurality of spring pressed stop pins carried by said bearing successively engageable with said cam faces to effect axial displacement of said ratchet cam and first cam, one of said pins having a ball end engaging said detents, a spring pressed pawl carried by said first cam engageable with said ratchet cam to rotate said ratchet cam therewith and a rim carried on said bearing arranged to disengage said pawl from said ratchet cam throughout all of the rotation of said first cam except a fraction thereof equal to a reciprocal of the number of pairs of said cam faces.

22. Intermittently operating tool advancing mechanism comprising a cam shaft, a bearing for said shaft, a tool holder, a cam member rotatable with said shaft and operable to engage and advance said tool holder by rotary and axial motion, a ratchet cam member positioned around said shaft and between said first cam member and said bearing, said ratchet cam having a plurality of progressively and axially stepped cam faces opposing said bearing, said faces having detents formed therein, a spring pressed stop pin carried by said bearing successively engageable with said cam faces to effect axial displacement of said ratchet cam and first cam, said pin having a ball end engaging said detents, a spring pressed pawl carried by said first cam engageable with said ratchet cam to rotate said ratchet cam therewith and a rim carried on said bearing arranged to disengage said pawl from said ratchet cam throughout all the rotation of said first cam except a fraction thereof equal to a reciprocal of the number of said cam faces.

23. Intermittently operating tool advancing mechanism comprising, a cam shaft, a bearing for said shaft, a tool holder, a cam member rotatable with said shaft and operable to engage and advance said tool holder by rotary and axial motion, a ratchet cam member positioned around said shaft and between said first cam member and said bearing, said ratchet cam having a plurality of progressively and axially stepped cam faces opposing said bearing, said faces having detents formed therein, a stop pin carried by said bearing successively engageable with said cam faces to effect axial displacement of said ratchet cam and first cam, said pin having a ball end engaging said detents, a spring pressed pawl carried by said first cam engageable with said ratchet cam to rotate said ratchet cam therewith and a rim carried on said bearing arranged to disengage said pawl from said ratchet cam throughout all the rotation of said first cam except a fraction thereof.

24. In combination with a lathe having a carriage and a chuck, a threading attachment comprising a base secured to said carriage, a cam shaft journaled on said base and connected to be driven from said lathe at one-half the speed of said chuck, a carriage plate slidably mounted on said base for motion parallel to the axis of said chuck, a lead cam rotatable with said cam shaft arranged to advance said carriage plate through slightly more than the lead of the thread to be cut, a tool holder slidably mounted on said carriage plate for motion at an angle oblique to said chuck and parallel to the side of the thread to be cut, a multiple point cutter on said tool holder, a cone cam rotatable with said cam shaft and slidable therealong, said cone cam having a raised surface arranged to position said tool holder in work engaging position, a fixed member on said carriage plate and around said cam shaft, a ratchet cam positioned between said cone cam and fixed member, said ratchet cam having a plurality of axially stepped faces disposed angularly therearound, a spring pressed stop member carried by said fixed member and successively engageable with said cam faces on said ratchet cam to impart axial movement thereto and to said cone cam, a pawl carried on said cone cam and arranged to rotate said ratchet cam, a pawl disengaging rim on said fixed member arranged to disengage said pawl except during a fraction of rotation thereof equal to the reciprocal of the number of cam faces on said ratchet member, and a spring urging said cone cam toward said ratchet cam, said lead cam and cone cam having their surfaces angularly disposed so that said tool holder is in engaged position only when said carriage plate is advanced.

25. In combination with a lathe having a carriage and a chuck, a threading attachment comprising a base secured to said carriage, a cam shaft journaled on said base and connected to be driven from said lathe, a carriage plate slidably mounted on said base for motion parallel to the axis of said chuck, a lead cam rotatable with said cam shaft arranged to advance said carriage plate, a tool holder slidably mounted on sid carriage plate for motion at an angle oblique to said chuck, a cone cam rotatable with said cam shaft and slidable therealong, said cone cam having a raised surface arranged to position said tool holder in work engaging position, a fixed member on said carriage plate and around said cam shaft, a ratchet cam positioned between said cone cam and fixed member, said ratchet cam having a plurality of axially stepped faces disposed angularly therearound, a stop member carried by said fixed member and successively engageable with said cam faces on said ratchet cam to impart axial movement thereto, a pawl carried on said cone cam and arranged to rotate said ratchet cam, a pawl disengaging rim on said carriage plate arranged to disengage said pawl except during a fraction of rotation thereof equal to the reciprocal of the number of cam faces on said ratchet member, and a spring urging said cone cam toward said ratchet cam.

26. In combination with a lathe having a carriage and a chuck, a base secured to said carriage, a cam shaft journaled on said base and connected to be driven from said lathe, a carriage plate slidably mounted on said base, a lead cam rotatable with said cam shaft arranged to advance said carriage plate, a tool holder slidably mounted on said carriage plate for motion at an angle oblique to said chuck, a second cam rotatable with said cam shaft and slidable therealong, said second cam having a raised surface arranged to position said tool holder in work engaging position, a fixed member on said carriage plate, a ratchet cam positioned between said second cam and fixed member, said ratchet cam having a plurality of axially stepped faces disposed angularly therearound, a stop member carried by said fixed member and successively engageable with said cam faces on said ratchet cam to impart axial movement thereto and to said second cam, a pawl rotatable with said shaft and arranged to rotate said ratchet cam, and a pawl disengaging rim on said carriage plate arranged to disengage said pawl except during a fraction of rotation thereof.

27. A threading attachment for a lathe having a carriage and a chuck comprising, a base adapted to be secured to said carriage, a carriage plate slidably mounted on said base for movement longitudinally of said base, a tool holder slidably mounted on said carriage plate for motion at an angle with respect to said base equal to slope of the thread to be cut, a cutting tool secured to said tool holder and having a plurality of cutting edges spaced apart by the pitch of the thread to be cut, a cam shaft journaled on said base, a lead cam on said cam shaft arranged to advance said carriage plate a distance equal to slightly less than twice the lead of the thread to be cut, a fixed member on said carriage plate and around said shaft, a cone cam rotatable with said shaft and arranged to advance said tool holder in a work engaging direction, a ratchet cam positioned between said cone cam and said fixed member, said ratchet cam having a series of axially raised cam faces, a stop carried on said fixed member arranged to successively engage said cam faces, and a pawl carried by said cone cam arranged to advance said faces on said ratchet cam across said stop.

28. A threading attachment for a lathe having a carriage and a chuck comprising, a base adapted to be secured to said carriage, a carriage plate slidably mounted on said base, a tool holder slidably mounted on said carriage plate for motion at an angle with respect to said base equal to slope of the thread to be cut, a cutting tool secured to said tool holder and having a plurality of cutting edges spaced apart by the lead of the thread to be cut, a cam shaft journaled on said base, a lead cam on said cam shaft arranged to advance said carriage plate a distance approximately equal to twice the lead of the thread to be cut, a fixed member on said carriage plate, a cone cam rotatable with said shaft and arranged to advance said tool holder in a work engaging direction, a ratchet cam positioned between said cone cam and said fixed member, said ratchet cam having a series of axially raised cam faces, a stop carried on said fixed member arranged to engage said cam faces, and a pawl carried by said cone cam arranged to advance said faces on said ratchet cam over said stop.

29. A threading attachment for a lathe having a carriage and a chuck comprising, a base adapted to be secured to said carriage, a carriage plate slidably mounted on said base for movement longitudinally of said lathe, a tool holder slidably mounted on said carriage plate for motion at an angle with respect to said base, a cutting tool secured to said tool holder and having a plurality of cutting edges spaced apart by the pitch distance of the thread to be cut, a cam shaft journaled on said base, a lead cam on said cam shaft arranged to advance said carriage plate on said base, a fixed member on said carriage plate, a cone cam rotatable with said shaft and arranged to advance said tool holder toward said chuck, a ratchet cam positioned between said cone cam and said fixed member, said ratchet cam having a series of axially raised cam faces, a stop carried on said fixed member arranged to engage said cam faces, and a pawl carried by said cone cam arranged to intermittently advance said faces on said ratchet cam over said stop.

ADAM E. ARMSTRONG.

REFERENCES CITED

The following references are of record in the file of this patent:

UNITED STATES PATENTS

| Number | Name | Date |
|---|---|---|
| 1,277,801 | Whitehouse | Sept. 3, 1918 |
| 1,737,739 | Stennan | Dec. 3, 1929 |
| 1,830,004 | Skoverski | Nov. 3, 1931 |
| 2,204,441 | Ogilvie | June 11, 1940 |
| 2,265,265 | Castelli | Dec. 9, 1941 |
| 2,435,046 | Martin | Jan. 27, 1948 |
| 2,468,478 | Ardoin | Apr. 26, 1949 |